United States Patent
Nakao et al.

(10) Patent No.: US 12,087,021 B2
(45) Date of Patent: Sep. 10, 2024

(54) SERVER, CONTROL METHOD, AND COMPUTER-READABLE RECORDING MEDIUM STORING CONTROL PROGRAM

(71) Applicant: FUJITSU LIMITED, Kawasaki (JP)

(72) Inventors: Takanori Nakao, Kawasaki (JP); Tomonori Kubota, Kawasaki (JP); Yukihiko Hirayanagi, Fuji (JP)

(73) Assignee: FUJITSU LIMITED, Kawasaki (JP)

( * ) Notice: Subject to any disclaimer, the term of this patent is extended or adjusted under 35 U.S.C. 154(b) by 47 days.

(21) Appl. No.: 18/181,600

(22) Filed: Mar. 10, 2023

(65) Prior Publication Data
US 2023/0215053 A1  Jul. 6, 2023

Related U.S. Application Data

(63) Continuation of application No. PCT/JP2020/040766, filed on Oct. 30, 2020.

(51) Int. Cl.
H04N 21/234 (2011.01)
G06T 7/00 (2017.01)
G06T 9/00 (2006.01)

(52) U.S. Cl.
CPC .............. *G06T 9/00* (2013.01); *G06T 7/0002* (2013.01)

(58) Field of Classification Search
CPC ........ G06T 9/00; G06T 7/0002; H04N 21/234
USPC ........................................................ 375/240
See application file for complete search history.

(56) References Cited

U.S. PATENT DOCUMENTS

| | | | |
|---|---|---|---|
| 8,686,881 B1* | 4/2014 | Harnik | H03M 7/6058 341/51 |
| 2011/0013694 A1* | 1/2011 | Watanabe | H04N 17/004 375/240.12 |
| 2018/0063526 A1* | 3/2018 | Choi | H04N 19/115 |
| 2019/0146883 A1 | 5/2019 | Miyazaki et al. | |
| 2019/0335192 A1 | 10/2019 | Otto et al. | |

(Continued)

FOREIGN PATENT DOCUMENTS

| | | |
|---|---|---|
| JP | 2010-171609 A | 8/2010 |
| JP | 2013-239995 A | 11/2013 |

(Continued)

OTHER PUBLICATIONS

International Search Report and Written Opinion of the International Searching Authority (Form PCT/ISA/210, 220 and 237), mailed in connection with PCT/JP2020/040766 and mailed Jan. 19, 2021 (Total 10 pages).

*Primary Examiner* — Susan E. Torgerson
(74) *Attorney, Agent, or Firm* — Fujitsu Intellectual Property Center

(57) ABSTRACT

A server includes: a memory; and a processor coupled to the memory and configures to: receive a frame image of a moving image compressed by an information processing device; detect a sign of deterioration in analysis accuracy based on accuracy information that represents certainty of an analysis result by artificial intelligence for the frame image; transmit, to the information processing device, instruction information of controlling a compression rate in compression of the moving image by the information processing device between an upper bound and a lower bound; and change the upper bound and the lower bound according to stability of the analysis accuracy based on the detection of a sign of deterioration in the analysis accuracy.

12 Claims, 14 Drawing Sheets

(56) References Cited

U.S. PATENT DOCUMENTS

2019/0371006 A1    12/2019  Liu et al.
2020/0219290 A1     7/2020  Tourapis et al.
2021/0400231 A1*   12/2021  Park ................. H04N 21/44209

FOREIGN PATENT DOCUMENTS

| JP | 2017-208707 A | 11/2017 |
| JP | 2020-120188 A | 8/2020 |

* cited by examiner

FIG. 7

| FRAME ID | QUANTIZATION VALUE |
|---|---|
| ... | ... |
| 0010 | 20 |
| 0011 | 21 |
| 0012 | 22 |
| 0013 | 23 |
| ... | ... |

700

FIG. 10A
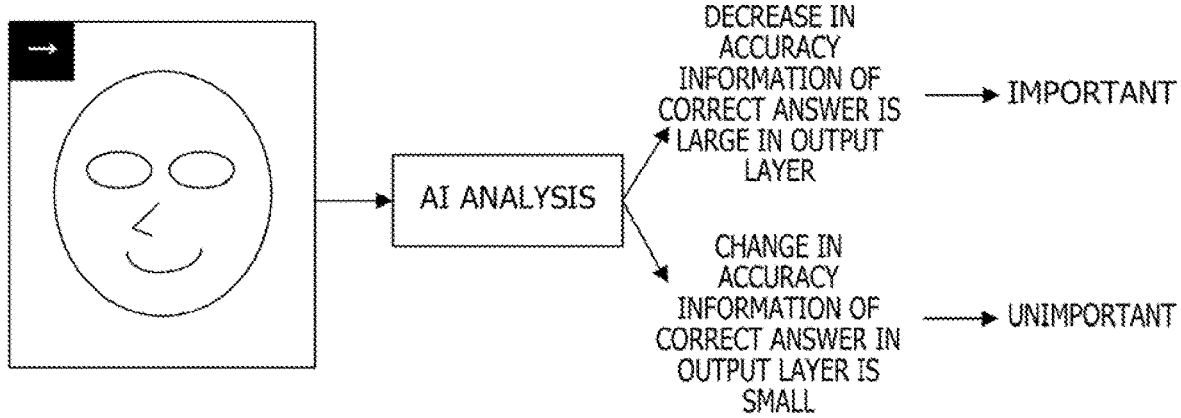
FIG. 10B
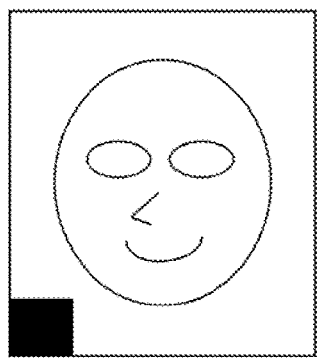
CHANGE IN ACCURACY INFORMATION OF CORRECT ANSWER IS SMALL
FIG. 10C
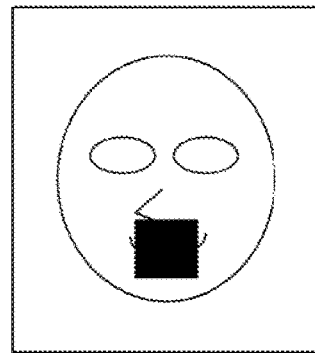
DECREASE IN ACCURACY INFORMATION OF CORRECT ANSWER IS LARGE
FIG. 10D
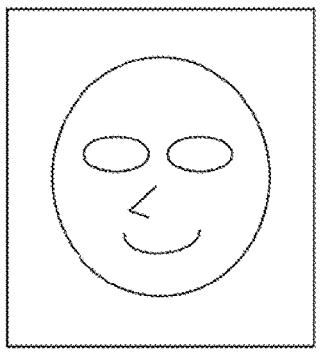 
| 10 | 10 | 10 | 10 | 10 |
|----|----|----|----|----|
| 10 | 5  | 5  | 5  | 10 |
| 10 | 0  | 5  | 0  | 5  |
| 10 | 0  | 0  | 0  | 10 |
| 10 | 0  | 0  | 0  | 10 |
| 10 | 10 | 10 | 10 | 10 |
IMPORTANCE MAP

SERVER, CONTROL METHOD, AND COMPUTER-READABLE RECORDING MEDIUM STORING CONTROL PROGRAM

CROSS-REFERENCE TO RELATED APPLICATION

This application is a continuation application of International Application PCT/JP2020/040766 filed on Oct. 30, 2020 and designated the U.S., the entire contents of which are incorporated herein by reference.

FIELD

The embodiments discussed herein are related to a server, a control method, and a control program.

BACKGROUND

In recent years, there has been a rapid increase in demand for analysis of moving image data with artificial intelligence (AI) in various business fields. Furthermore, the number of imaging devices installed for AI analysis tends to increase, and the amount of moving image data to be analyzed is increasing.

U.S. Patent Application Publication No. 2019/0371006, U.S. Patent Application Publication No. 2019/0335192, and U.S. Patent Application Publication No. 2020/0219290 are disclosed as related art.

SUMMARY

According to an aspect of the embodiments, a server includes: a memory; and a processor coupled to the memory and configures to: receive a frame image of a moving image compressed by an information processing device; detect a sign of deterioration in analysis accuracy based on accuracy information that represents certainty of an analysis result by artificial intelligence for the frame image; transmit, to the information processing device, instruction information of controlling a compression rate in compression of the moving image by the information processing device between an upper bound and a lower bound; and change the upper bound and the lower bound according to stability of the analysis accuracy based on the detection of a sign of deterioration in the analysis accuracy.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a table illustrating quantization value information according to the embodiment;

FIGS. 10A to 10D are diagrams illustrating generation of an exemplary importance map;

DESCRIPTION OF EMBODIMENTS

Figure 1:
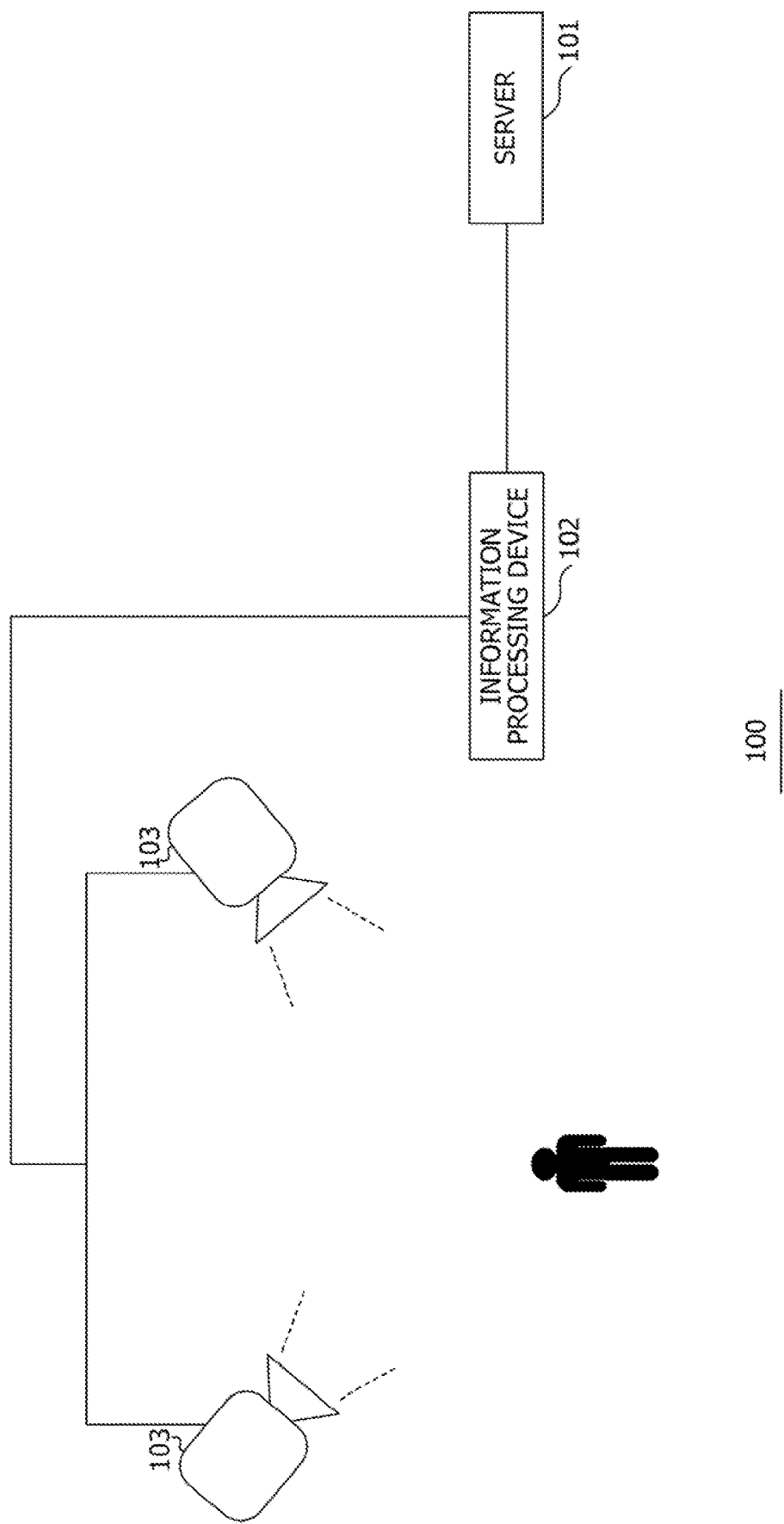
FIG. 1 is a diagram illustrating a system according to an embodiment.

For example, deep learning is used for AI analysis of moving image data. Deep learning is often performed by a server on the cloud due to a huge amount of processing for analysis. In this case, the moving image data captured by an imaging device is transmitted from a locally arranged information processing device to the server arranged on the cloud, for example. In this case, since the size of the moving image data is large, the moving image data is sometimes compressed before being transmitted to the server so that a network band is not congested.

In this regard, techniques related to moving image encoding are known.

However, when transmitting the moving image data to the server, the moving image data may be over-compressed, and analysis accuracy by AI by the server may be deteriorated due to deterioration of image quality. Therefore, it is desired to provide a technique that can compress the moving image data as much as possible while suppressing deterioration in the analysis accuracy of AI analysis executed by the server when compressing and transmitting the moving image data to the server, for example.

In one aspect, an object of the present embodiments is to increase a compression rate of moving image data while suppressing deterioration in analysis accuracy of AI analysis.

Hereinafter, several embodiments will be described in detail with reference to the drawings. Note that corresponding elements in a plurality of drawings are denoted with the same reference numeral.

As described above, when moving image data captured by an imaging device is transmitted to a server, the moving image data is compressed before being transmitted to the server. In this case, image quality of the moving image data may be excessively deteriorated, and analysis accuracy by AI on the server is sometimes deteriorated.

Therefore, it is desired to provide a technique that can increase a compression rate of the moving image data while suppressing deterioration in the analysis accuracy of AI analysis.

Here, as one method for determining the compression rate of moving image data, it is conceivable to use analysis results of the AI analysis in the server. For example, many AIs that analyze images output accuracy information that indicates reliability of the analysis results along with the analysis results in the analysis. For example, a trained model obtained by deep learning outputs a reliability score indicating certainty of a detection result in target detection. For example, such a reliability score may be used as the accuracy information indicating the certainty of analysis. Then, for example, it is conceivable to detect deterioration in the analysis accuracy of the AI analysis based on the accuracy information, and lower the compression rate in the case where the analysis accuracy is deteriorated.

However, in this case, the compression rate is lowered after the analysis accuracy of the AI analysis is deteriorated. As a result, for example, a time period during which the analysis accuracy is deteriorated may become longer. Therefore, it is desired to provide a technique that can increase the compression rate of the moving image data while suppressing the accuracy deterioration in AI analysis on the server when transmitting the moving image data to the server. Hereinafter, embodiments will be described in more detail.

FIG. 1 is a diagram illustrating a system 100 according to an embodiment. The system 100 includes a server 101, an information processing device 102, and an imaging device 103, for example.

The server 101 may be, for example, a computer such as a server computer, which executes AI analysis for moving image data. The server 101 is, for example, a computer that operates on the cloud.

The information processing device 102 may be, for example, a computer such as a personal computer (PC), a mobile computer, a tablet terminal, or a smartphone, which has a function to process moving image data. For example, the information processing device 102 may operate as an edge in edge computing, apply compression processing or the like to moving image data captured by the imaging device 103, and transmit the moving image data to the server 101.

The imaging device 103 is, for example, a device such as a camera, which captures a moving image, and captures a moving image that includes a person to be analyzed or the like. In recent years, the number of imaging devices 103 installed for AI analysis tends to increase, and a plurality of the imaging devices 103 may be installed, as illustrated in FIG. 1, for example. Note that the system 100 according to the embodiment is not limited to having the plurality of imaging devices 103, and the embodiment may be used to transmit the moving image data captured by one imaging device 103 from the information processing device 102 to the server 101, for example. Furthermore, in one example, the information processing device 102 and the imaging device 103 may be an integrated device.

Figure 2:
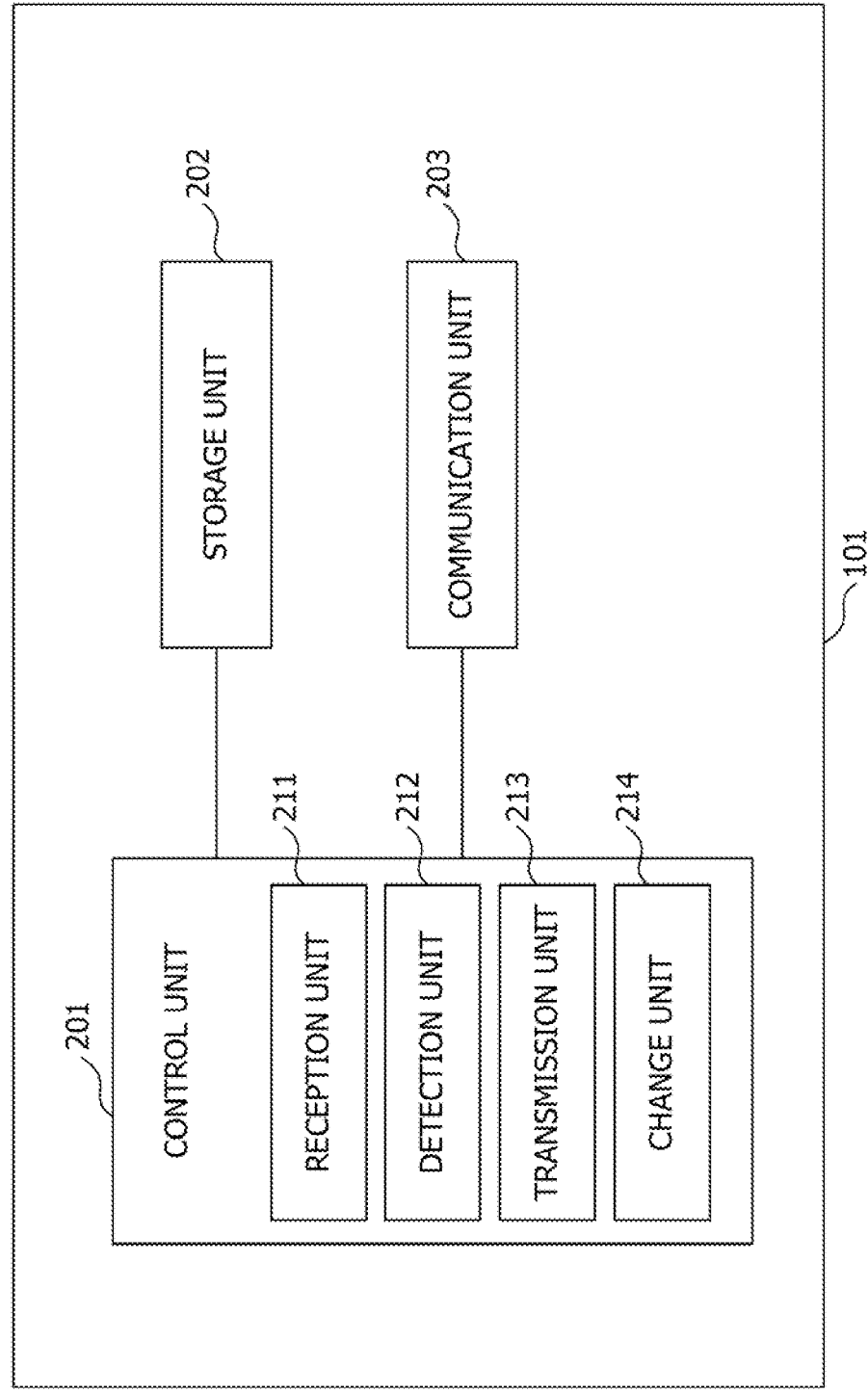
FIG. 2 is a diagram illustrating a functional block configuration of a server according to the embodiment.

FIG. 2 is a diagram illustrating a functional block configuration of the server 101 according to the embodiment. The server 101 includes a control unit 201, a storage unit 202, and a communication unit 203, for example. The control unit 201 includes, for example, a reception unit 211, a detection unit 212, a transmission unit 213, a change unit 214, and the like, and may also include other functional units. The storage unit 202 of the server 101 stores, for example, quantization value information 700 to be described below and information such as compressed moving image data received from the information processing device 102. Details of each of these units and details of the information stored in the storage unit 202 will be described below.

Figure 3:
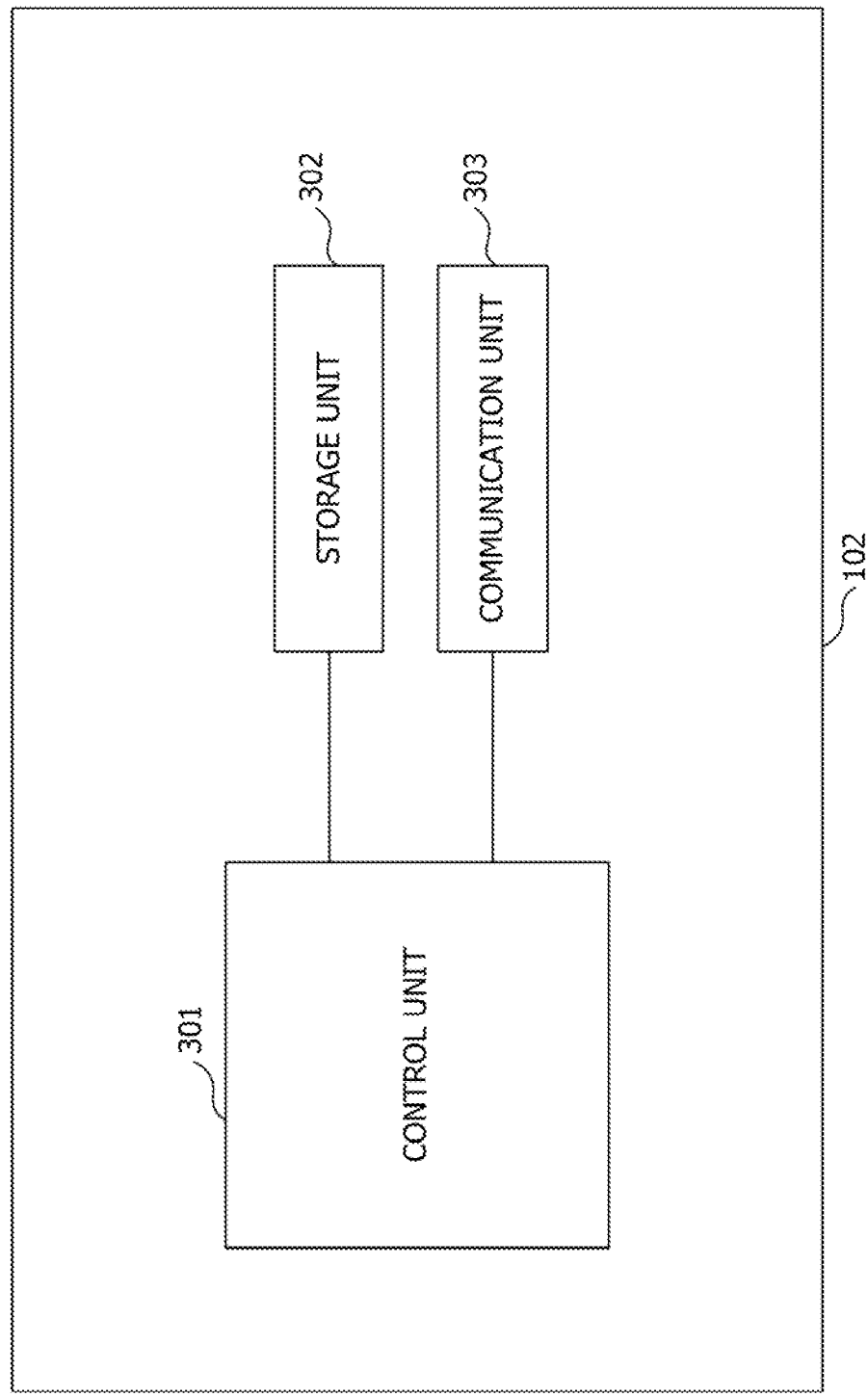
FIG. 3 is a diagram illustrating a functional block configuration of an information processing device according to the embodiment.

FIG. 3 is a diagram illustrating a functional block configuration of the information processing device 102 according to the embodiment. The information processing device 102 includes, for example, a control unit 301, a storage unit 302, and a communication unit 303. The control unit 301 controls each unit of the information processing device 102, for example. The storage unit 302 of the information processing device 102 may store, for example, the moving image data acquired from the imaging device 103, instruction information notified from the server 101 as will be described below, and the like. Details of each of these units and details of the information stored in the storage unit 302 will be described below.

Next, processing of detecting signs of deterioration in analysis accuracy in AI analysis will be described.

<Detection of Signs of Deterioration in Analysis Accuracy>

Figure 4:
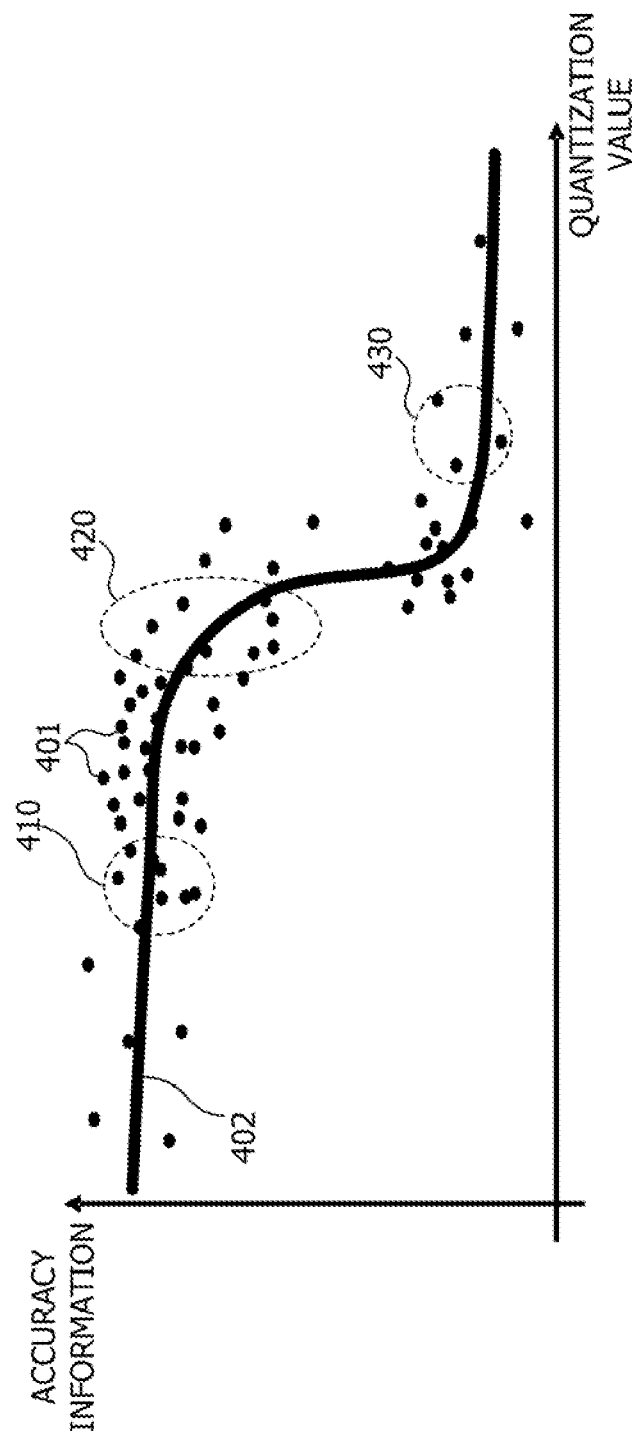
FIG. 4 is a graph illustrating an exemplary relationship between accuracy information and quantization values.

FIG. 4 is a graph illustrating an exemplary relationship between accuracy information and quantization values. In the example of FIG. 4, the vertical axis represents the accuracy information and the horizontal axis represents the quantization values. The accuracy information represents, for example, analysis accuracy of AI analysis, and in one example, the accuracy information may be a reliability score representing certainty of an analysis result generated during the AI analysis.

A quantization value is, for example, a value representing a compression rate of a frame image of a moving image. The quantization value may be, for example, a quantization parameter (QP) that is used in moving image coding methods such as H.264 and H.265. In this case, for example, the smaller the numerical value of the quantization value, the lower the compression rate and the sharper the image quality, and the higher the numerical value, the higher the compression rate and the coarser the image quality.

Furthermore, FIG. 4 also illustrates points 401 corresponding to frame images of a moving image. A point 401 represents a set of the quantization value used to compress the frame image and the accuracy information of a result of the AI analysis using the frame image compressed with the quantization value. FIG. 4 illustrates a plurality of the points 401 corresponding to various quantization values. The accuracy information of the point 401 takes various values depending on scenes even with the same quantization value, and there are variations. Therefore, it is difficult to uniformly detect a sign of deterioration using the threshold even if the threshold is set for the accuracy information.

Here, an approximated curve 402 generated for the plurality of points 401 is illustrated in FIG. 4. Then, the inventors of the present application have found that, in the relationship between the quantization value and the accuracy information, the accuracy information tends to decrease sharply after a certain quantization value, and variation in the accuracy information with respect to the quantization value becomes large near a boundary, as illustrated by the approximated curve 402.

For example, as illustrated in FIG. 4, in a region 410, the quantization value is sufficiently small so that a decrease in the accuracy information does not occur, and the variation in the accuracy information is kept small. Furthermore, in a region 430, the quantization value is too large and the accuracy information has completely decreased, and the accuracy information decreases in whole, and thus the variation in the accuracy information is small. However, for example, in a region where the accuracy information begins to decrease, as illustrated in a region 420, the deterioration in the analysis accuracy is still suppressed, but the variation in the accuracy information with respect to the quantization value is large.

Therefore, in one embodiment, the control unit 201 of the server 101 controls the quantization value in the case where the variation in the accuracy information with respect to the quantization value becomes large, considering it as a sign of deterioration in the analysis accuracy. As illustrated in FIG. 4, the accuracy information has not completely dropped in the quantization value in the region 420, and it is possible to suppress the deterioration in the analysis accuracy by lowering the quantization value to lower the compression rate at the point of time when detecting the sign of the deterioration in the analysis accuracy. Furthermore, the deterioration in the analysis accuracy can be more quickly dealt with than a case of changing the quantization value after the accuracy information has completely decreased as in the region 430, and thus the moving image data can be analyzed with high accuracy in whole.

Here, for example, the increase in temporal variation as illustrated in the region 420 in FIG. 4 have a greater impact on a set of the accuracy information obtained from shorter-term frame images than a set of the accuracy information obtained from longer-term frame images.

Therefore, in the case where the variation in the accuracy information obtained from the short-term frame images of the moving image is greater than in the accuracy information obtained from the long-term frame images, the control unit 201 may determine that the sign of the accuracy deterioration has been detected by the AI analysis using the short-term frame images.

For example, the control unit 201 obtains variance in the accuracy information obtained from the long-term frame images and variance in the accuracy information obtained from the short-term frame images. Then, in a case where the variance in the short-term accuracy information is larger than the variance in the long-term accuracy information, the control unit 201 may determine that the sign of the accuracy deterioration has been detected in the short-term frame images. Note that, for example, the long-term frame images may be frame images of past 50 to 1000 frames from a frame image to be processed, and may be, in one example, past 100 frames from the frame image to be processed. Furthermore, for example, the short-term frame images may be frame images of past 10 to 50 frames from the frame image to be processed, and may be, in one example, frame images of past 20 frames from the frame image to be processed. Note that the long-term and short-term periods are not limited to these cases, and may be set according to, for example, a speed of movement of a target for the AI analysis, a frame rate of the moving image to be captured, and the like.

Furthermore, in another embodiment, the control unit 201 determines whether the accuracy indicated by a second index representing the accuracy information obtained from the short-term frame images of the moving image is more deteriorated than the accuracy indicated by a first index representing the accuracy information obtained from the long-term frame images. Then, in a case where the accuracy indicated by the second index is more deteriorated than that indicated by the first index, the control unit 201 may determine that the sign of the accuracy deterioration has been detected by the AI analysis using the short-term frame images. In one example, the control unit 201 may obtain a moving average of the accuracy information of the long-term frame images and the accuracy information of the short-term frame images, and determine that the sign of deterioration has been detected when a difference between two values increases.

For example, by performing control to decrease the compression rate or the like in the case of executing detection of the sign of the accuracy deterioration in the AI analysis and detecting the sign, as described above, it is possible to increase the compression rate of the moving image data while suppressing the accuracy deterioration in the AI analysis. Note that the long-term frame image may be called, for example, a first period frame image. The short-term frame image may be called, for example, a second period frame image. The second period may be shorter than the first period.

Next, control of the compression rate according to the embodiment will be described.

<Control of Compression Rate>

An example of controlling the compression rate using the quantization value will be described below. For example, the control unit 201 sets an upper bound and a lower bound for the quantization value, and controls the quantization value to be used for compression so as to fluctuate between the upper bound and the lower bound. The control unit 201 may control the quantization value as follows, for example.

(Control of Quantization Value)

Figure 5:
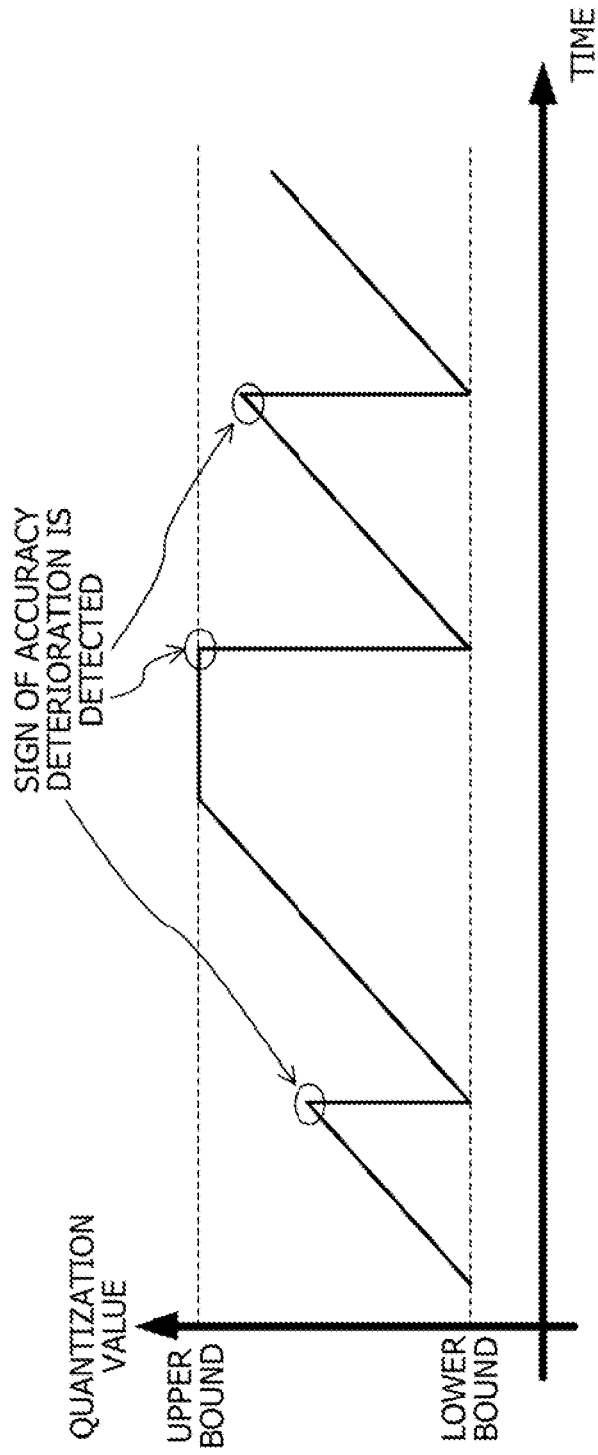
FIG. 5 is a graph illustrating control of the quantization values according to the embodiment.

FIG. 5 is a graph illustrating control of the quantization value according to the embodiment. As illustrated in FIG. 5, the upper bound and the lower bound are set for the quantization value. Then, the control unit 201 may gradually raise the quantization value in a case where the AI analysis is performed with sufficient accuracy, for example. Furthermore, the control unit 201 may set the quantization value so as to be lowered to the lower bound at once in a case where the sign of the deterioration in the analysis accuracy is detected. Thereby, a time for the accuracy deterioration can be minimized. Furthermore, by setting the lower bound to a last possible value at which the sign of the deterioration in the analysis accuracy is not detected, it is possible to maintain a high compression rate even in the case of detecting the sign of the deterioration in the analysis accuracy after raising the quantization value, and lowering the quantization value to the lower bound.

Furthermore, as illustrated in FIG. 5, for example, the control unit 201 gradually raises the quantization value and maintains the quantization value at the upper bound when the quantization value has reached the upper bound. For example, in a case of continuously raising the quantization value without providing the upper bound, the sign of the deterioration in the analysis accuracy will be eventually detected and the quantization value will be returned to the lower bound. Then, the deterioration in the analysis accuracy will occur if the sign of the deterioration in the analysis accuracy is frequently detected even if the accuracy information has not completely decreased at the point of time of the sign. Furthermore, in this case, the quantization value is also frequently returned to the lower bound, leading to a decrease in the compression rate. Therefore, by setting the upper bound to the quantization value and setting the quantization value to a last possible value at which the sign of the deterioration in the analysis accuracy is detected with low frequency, it is possible to suppress the accuracy deterioration while maintaining a high compression state.

Next, change of the upper bound and the lower bound according to the embodiment will be described. In the embodiments to be described below, the control unit 201 changes the upper bound and the lower bound according to stability of the analysis accuracy based on detection of the sign of the deterioration in the analysis accuracy.

(Change of Upper Bound and Lower Bound)

For example, in a case where sufficient analysis accuracy can be maintained for a long period in a state where the quantization value is equal to the upper bound, there is a possibility that sufficient analysis accuracy can be obtained even if the image quality is further reduced. Therefore, the control unit 201 may increase the upper bound.

Meanwhile, in a case where control of the quantization value to the upper bound is small, for example, the case indicates that the sign of the accuracy deterioration in the AI analysis has been detected before or immediately after the quantization value reaches the upper bound when the quantization value is gradually raised. In this case, it is considered that the upper bound is too high and the sign of the accuracy deterioration in the AI analysis has been detected. Therefore, the control unit 201 may lower the upper bound.

Furthermore, for example, it is assumed that the sign of the accuracy deterioration in the AI analysis is detected in a state where the quantization value is equal to the lower bound. In this case, since there is a possibility that the AI analysis accuracy may be deteriorated even if the quantization value is set to the set lower bound and compression is performed, the control unit 201 may reduce the lower bound so that the accuracy deterioration in the AI analysis does not occur.

Meanwhile, for example, it is assumed that, for the quantization value equal to or higher than the lower bound, no sign of the accuracy deterioration in the AI analysis is detected over a predetermined period, and sufficient analysis accuracy is achieved. In this case, since there is a possibility of being able to raise the lower bound, the control unit 201 may increase the lower bound.

Then, for example, by causing the values of the upper bound and the lower bound to fluctuate, as described above, it is possible to maintain a stable high compression rate and compress the moving image data while suppressing deterioration in the analysis accuracy of the AI analysis.

Moreover, the control unit 201 may further determine that the upper bound and the lower bound have converged in a case where, for example, the values of the upper bound and the lower bound satisfy a predetermined convergence condition, and may perform control to reduce a change width and a change frequency of the upper bound and the lower bound. For example, in a case where the upper bound and the lower bound come to fluctuate around the same value according to the above-described control, the control unit 201 may determine that the upper bound and the lower bound have converged.

On the other hand, the control unit 201 may determine that the upper bound and the lower bound have not converged and are fluctuating in a case where, for example, the values of the upper bound and the lower bound satisfy a predetermined fluctuation condition, and may perform control to increase the change width and the change frequency of the upper bound and the lower bound. For example, in a case where the upper bound and the lower bound continue to be updated in the same direction a predetermined number of times or more according to the above-described control, the control unit 201 may determine that the upper bound and the lower bound are fluctuating.

For example, by controlling the change width and the change frequency of the upper bound and the lower bound as described above, it is possible to reduce the amount of processing for controlling the upper bound and the lower bound and to cause the upper bound and the lower bound to quickly converge to the appropriate values.

As described above, according to the embodiment, by setting upper bound and the lower bound and narrowing down a possible range of the quantization value according to changes in moving image scenes and detection targets, it is possible to maintain the high compression rate and compress the moving image data while suppressing the deterioration in the analysis accuracy of the AI analysis.

Next, an example of instruction information transmission processing according to the embodiment will be described. The control unit 201 of the server 101 may control the compression rate of the frame images of the moving image received from the information processing device 102 by, for example, executing the following instruction information transmission processing to transmit instruction information to the information processing device 102.

Figure 6:
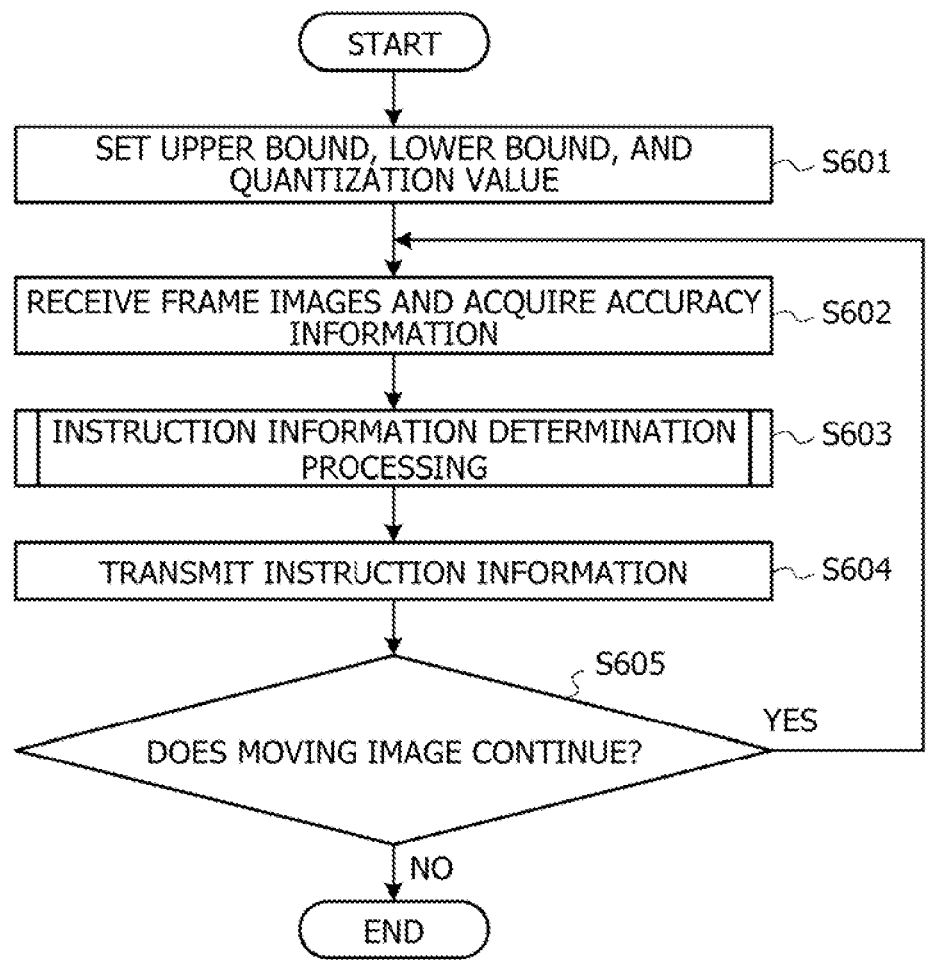
FIG. 6 is a flowchart illustrating an operation flow of instruction information transmission processing according to the embodiment.

FIG. 6 is a flowchart illustrating an operation flow of instruction information transmission processing according to the embodiment. For example, the control unit 201 of the server 101 may start the operation flow in FIG. 6 when starting execution of the AI analysis for the moving image data received from the information processing device 102.

In step 601 (hereinafter, step is described as "S", for example, described as S601), the control unit 201 sets the upper bound, the lower bound, and the quantization value. For example, the control unit 201 may set the quantization value currently applied to the frame image of the moving image data received from the information processing device 102 as the quantization value. Furthermore, the control unit 201 may set, for example, a predetermined value set in advance to each of the upper bound and the lower bound. Note that, in one example, a larger value may be set to the upper bound than the value set to the lower bound. Furthermore, the quantization value may be set to a value between the upper bound and the lower bound.

In S602, the control unit 201 receives the frame images of the moving image from the information processing device 102, executes the AI analysis for the received frame images, and acquires the accuracy information that represents the certainty of the analysis results.

In S603, the control unit 201 executes instruction information determination processing. In one example, the control unit 201 may determine the quantization value to be used to compress the moving image data in the information processing device 102 based on the acquired accuracy information. Details of the instruction information determination processing will be described below with reference to FIG. 8.

In S604, the control unit 201 transmits instruction information to the information processing device 102. The instruction information may include, for example, the quantization value determined in the processing of S603. Furthermore, the control unit 201 may register the quantization value included in the instruction information to be transmitted to the information processing device 102 in the quantization value information 700 in association with a frame identifier (ID) that identifies the frame image to be processed in the operation flow of FIG. 6.

FIG. 7 is a table illustrating the quantization value information 700 according to the embodiment. The quantization value information 700 may include, for example, a history of the quantization value determined in the instruction information determination processing of S603. In the example of FIG. 7, records in which the frame IDs and the quantization values are associated with each other are registered. The frame ID of the record is identification information for identifying the frame image in the moving image. Furthermore, as the quantization value of the quantization value information 700, for example, the quantization value determined by the instruction information determination processing using the accuracy information of the frame image identified by the frame ID of the record may be registered. By referring to the quantization value information 700, the control unit 201 can acquire the quantization value set in the past.

Next, in S605, the control unit 201 may determine whether the moving image still continues. For example, in a case where a subsequent frame image of the moving image is still being received from the information processing device 102, the control unit 201 may determine YES in S605, and the flow returns to S602 and the control unit 201 repeats the processing for the next frame image. On the other hand, for example, in a case where reception of the moving image data from the information processing device 102 has been completed, the control unit 201 may determine NO in S605, and the present operation flow ends.

According to the operation flow of FIG. 6, the control unit 201 can determine the instruction information based on the accuracy information of the AI analysis for the frame images of the moving image received from the information processing device 102 and transmit the instruction information to the information processing device 102.

Next, an example of the instruction information determination processing according to the embodiment will be described.

Figure 8:
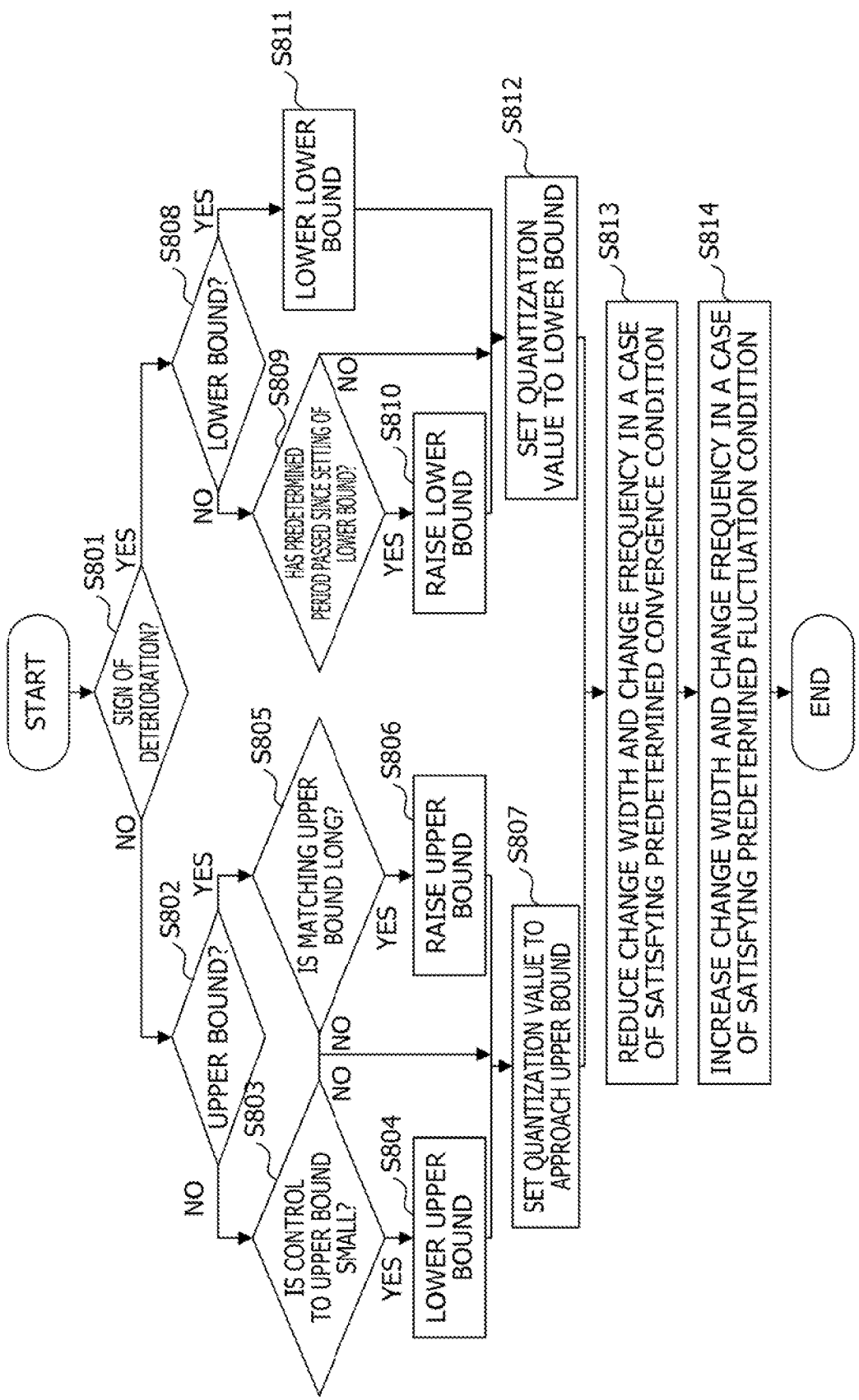
FIG. 8 is a flowchart illustrating an operation flow of instruction information determination processing according to the embodiment.

FIG. 8 is a flowchart illustrating an operation flow of the instruction information determination processing according to the embodiment. The control unit 201 of the server 101 may start the operation flow of FIG. 8 when proceeding to S603 of FIG. 6, for example.

In S801, the control unit 201 determines whether the sign of the accuracy deterioration in the AI analysis has been detected. For example, as exemplified with reference to FIG. 4, the control unit 201 may detect the sign of the accuracy deterioration based on the variation in the accuracy information obtained from the long-term frame images and the accuracy information obtained from the short-term frame images. Then, in a case where no sign of the accuracy deterioration in the AI analysis has been detected (NO in S801), the flow proceeds to S802.

In S802, the control unit 201 determines whether the quantization value is the upper bound. For example, in a case where the quantization value currently applied to the frame image of the moving image data received from the information processing device 102 does not match the upper bound (NO in S802), the flow proceeds to S803.

In S803, the control unit 201 determines whether the control of the quantization value to the upper bound satisfies a predetermined change condition and is small. For example, the control unit 201 refers to the quantization value information 700, and determines whether a ratio of frames whose quantization values match the upper bound in a past predetermined period from the frame to be processed is equal to or less than a predetermined ratio. Then, in a case where the ratio of frames whose quantization values match the upper bound is equal to or less than the predetermined ratio, the control unit 201 may determine that the control of the quantization value to the upper bound is small and determine YES in S803, and the flow proceeds to S804.

This case indicates that the sign of the accuracy deterioration in the AI analysis has been detected before or immediately after the quantization value reaches the upper bound when the quantization value is gradually raised, and indicates that the upper bound is too high and the sign of the accuracy deterioration in the AI analysis has been detected. Therefore, in S804, the control unit 201 executes control to lower the upper bound. For example, the control unit 201 may lower the quantization value to be set as the upper bound by a predetermined value.

Meanwhile, in S803, in a case where the ratio of frames whose quantization values match the upper bound is larger than the predetermined ratio, for example, the control unit 201 may determine that the control to the upper bound is not small and determine NO in S803, and the flow proceeds to S807.

Furthermore, for example, in S802, in a case where the quantization value currently applied to the frame image of the moving image data received from the information processing device 102 matches the upper bound (YES in S802), the flow proceeds to S805.

In S805, the control unit 201 determines whether the sign of the deterioration in the analysis accuracy is not detected while satisfying a predetermined condition in a state of matching the upper bound, and the state of matching the upper bound continues for a long time. For example, the control unit 201 refers to the quantization value information 700, and may determine that the state of matching the upper bound is long in a case where the state of matching the upper bound has continued for a past predetermined period or more from the frame to be processed and determine YES in S803, and the flow proceeds to S806.

This case indicates that the quantization value has been gradually raised, and even after the quantization value has reached the upper bound, no sign of the accuracy deterioration in the AI analysis has been detected for a while, and the AI analysis has been being able to be stably performed, and indicates that there is a possibility of being able to further raise the upper bound. Therefore, in S806, the control unit 201 executes control to raise the upper bound. For example, the control unit 201 may raise the quantization value to be set as the upper bound by a predetermined value.

Meanwhile, in S805, in a case where the state of matching the upper bound has not continued for a predetermined period or more in the past from the frame to be processed, for example, it may be determined that the state of matching the upper bound is not long and NO in S805, and the flow proceeds to S807.

Next, in S807, the control unit 201 sets the quantization value so as to approach the upper bound. For example, in a case where the quantization value is low and has not yet reached the upper bound, the control unit 201 may execute control to raise the quantization value by a predetermined value.

Furthermore, in S801, in a case where the sign of the accuracy deterioration in the AI analysis has been detected (YES in S801), the flow proceeds to S808.

In S808, the control unit 201 determines whether the quantization value is the lower bound. For example, in a case where the quantization value currently applied to the frame image of the moving image data received from the information processing device 102 does not match the lower bound (NO in S808), the flow proceeds to S809.

In S809, the control unit 201 determines whether a predetermined period has passed since the setting of the current lower bound. Then, in a case where the predetermined period has passed since the setting of the current lower bound (YES in S809), the flow proceeds to S810.

This case indicates that no sign of the accuracy deterioration in the AI analysis has been detected in the lower bound for a while since the setting of the current lower bound, and the AI analysis has been being able to be stably performed in the set lower bound. Therefore, there is a possibility of being able to further raise the lower bound, and the control unit 201 executes control to raise the lower bound in S810. For example, in S810, the control unit 201 may raise the quantization value to be set as the lower bound by a predetermined value.

On the other hand, in S809, for example, in a case where the predetermined period has not passed since the setting of the current lower bound (NO in S809), the flow proceeds to S812.

Furthermore, in S808, in a case where the quantization value currently applied to the frame image of the moving image data received from the information processing device 102 matches the lower bound (YES in S808), for example, the flow proceeds to S811.

In this case, the sign of the accuracy deterioration in the AI analysis is detected even in the lower bound, indicating that the accuracy deterioration in the AI analysis can occur even in the set lower bound. Therefore, in S811, the control unit 201 may execute control to lower the lower bound. Note that the lower bound is favorably set to a sufficiently low value so as not to cause the accuracy deterioration in the AI analysis, and the lower bound may be greatly lowered in S811. For example, in S811, the control unit 201 may lower the lower bound by a value larger than the predetermined amount for adjusting the upper bound or the lower bound in S804, S806, and S810.

Next, in S812, the control unit 201 sets the quantization value to the lower bound. The value of the lower bound is controlled so as to be set to a sufficiently low value so that the accuracy deterioration in the AI analysis is unlikely to occur, for example. Therefore, by setting the quantization value to the lower bound in the case where the sign of the accuracy deterioration in the AI analysis is detected, it is possible to perform control such that the frame images for which highly accurate AI analysis can be executed with a high probability in subsequent frames are received from the information processing device 102.

Next, in S813, the control unit 201 determines whether the values of the upper bound and the lower bound have converged while satisfying a predetermined convergence condition, and perform control to reduce the change width and the change frequency of the upper bound and the lower bound in a case where the values of the upper bound and the lower bound have converged. For example, the control unit 201 may determine that the upper bound and the lower bound have converged in a case where the upper bound fluctuates around the same value and the lower bound fluctuates around the same value. As an example, the control unit 201 may determine that the upper bound and the lower bound have converged in a case where the upper bound and the lower bound have been set to the same value a predetermined number of times or more during a past predetermined period from the frame to be processed. Furthermore, in another example, the control unit 201 may determine that the upper bound and the lower bound have converged in a case where a difference between the values set for the upper bound and the lower bound during a past predetermined period from the frame to be processed falls within a predetermined range. Then, in the case of determining that the upper bound and the lower bound have converged, the control unit 201 may perform control to reduce the change width and the change frequency of the upper bound and the lower bound. Note that the determination of convergence and the change of the change width and the change frequency may be separately executed for each of the upper bound and the lower bound.

For example, by controlling the change width and change frequency of the upper bound and the lower bound as described above, it is possible to increase stability in which the quantization value is maintained to a favorable value. Furthermore, it is possible to reduce the amount of processing for updating the upper bound and the lower bound.

In S814, for example, the control unit 201 may determine whether the values of the upper bound and the lower bound have not converged and are fluctuating while satisfying a predetermined fluctuation condition. Then, in a case where the upper bound and the lower bound are fluctuating, the control unit 201 may perform control to increase the change width and change frequency of the upper bound and the lower bound. For example, the control unit 201 may determine that the upper bound and the lower bound are fluctuating in a case where the upper bound and the lower bound are continuously updated a predetermined number of times or more in the same direction. Furthermore, in another example, the control unit 201 may determine that the upper bound and the lower bound are fluctuating in a case where the difference between the values set for the upper bound and the lower bound during a past predetermined period from the frame to be processed exceeds a predetermined range. Then, in the case of determining that the upper bound and the lower bound are fluctuating, the control unit 201 may perform control so as to increase the change width and change frequency of the upper bound and the lower bound. Note that the determination of fluctuation and the change of the change width and the change frequency may be separately executed for each of the upper bound and the lower bound.

For example, by performing control to increase the change width and the change frequency of the upper bound and the lower bound in this way, it becomes possible to quickly set the quantization value to a favorable value even in a case where the appropriate quantization value changes with changes in a scene or the like in the moving image. The scene changes may include, for example, changes in people in the moving image, changes in weather, changes in brightness between day and night, and the like.

Then, when the processing of S814 is completed, the present operation flow ends and the flow proceeds to S604 in FIG. 6.

As described above, according to the operation flow in FIG. 8, it is possible to set the quantization value to compress the moving image data as much as possible while suppressing the deterioration in the analysis accuracy of the AI analysis based on detection of the sign of the accuracy deterioration of the AI analysis.

Furthermore, according to the operation flow in FIG. 8, it is possible to set the values of the upper bound and the lower bound to maintain the state where the moving image data is compressed as much as possible while suppressing the deterioration in the analysis accuracy of the AI analysis based on detection of the sign of the accuracy deterioration of the AI analysis.

For example, by executing the control according to the above-described embodiment and setting the upper bound to a value at which the sign of the accuracy deterioration of the AI analysis is detected with low frequency, it is possible to stabilize the accuracy of the AI analysis while maintaining a high compression rate. Furthermore, for example, by executing the control according to the above-described embodiment and setting the lower bound to a value at which the sign of the accuracy deterioration of the AI analysis is not detected, it becomes possible to quickly react to the changes in a scene or the like and set the quantization value while stabilizing the accuracy of the AI analysis.

Furthermore, according to the operation flow of FIG. 8, it is possible to reduce the amount of processing by detecting the convergence of the upper bound and the lower bound and reducing the change width and the change frequency of the upper bound and the lower bound. Meanwhile, according to the operation flow in FIG. 8, by detecting fluctuations in the upper bound and the lower bound and increasing the change width and the change frequency of the upper bound and the lower bound, it is possible to quickly set favorable values to the quantization value, the upper bound, and the lower bound even in the case where the appropriate quantization value changes with the changes in a scene or the like in the moving image.

Note that, for example, in the case of using the quantization parameter that is used in the moving image coding methods such as H.264 and H.265 as the quantization value, an integer in a range of 0 to 51 is used as the quantization value. However, the control unit 201 of the server 101 may treat the quantization value as a continuous value including values after the decimal point, for example, and change the quantization value in units of less than 1 such as 0.1 and 0.05 in the processing of S807 and S812. In this case, the control unit 201 may control the compression rate by converting the quantization value to an integer by rounding off values after the decimal point to the nearest whole number, for example, when transmitting the instruction information including the quantization value in the processing of S604.

Next, an example of compressed moving image data transmission processing executed by the control unit 301 of the information processing device 102 according to the embodiment will be described.

Figure 9:
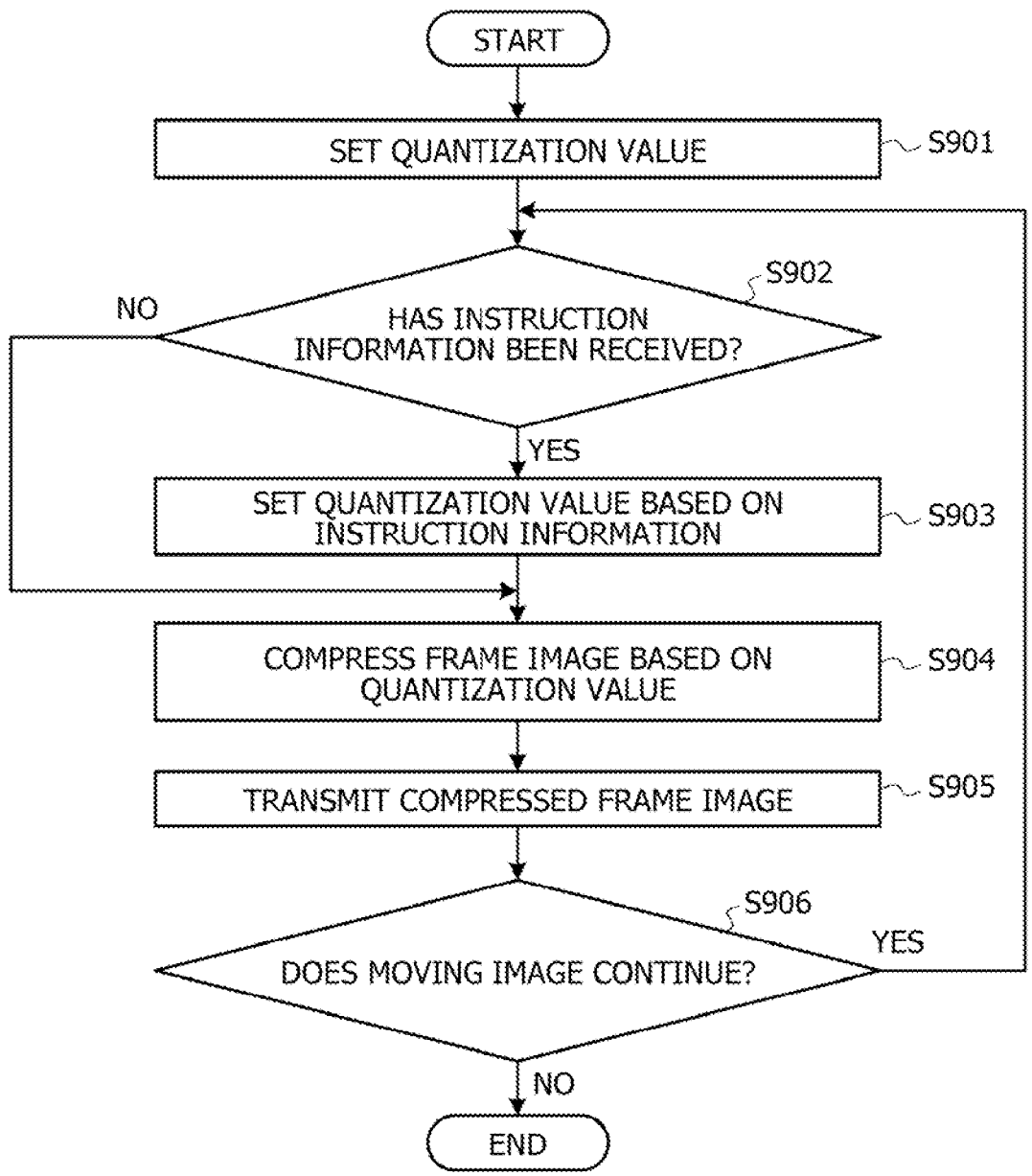
FIG. 9 is a flowchart illustrating an operation flow of compressed moving image data transmission processing according to the embodiment.

FIG. 9 is a flowchart illustrating an operation flow of compressed moving image data transmission processing according to the embodiment. For example, the control unit 301 of the information processing device 102 may start the operation flow of FIG. 9 when starting transmission of the moving image data captured by the imaging device 103 to the server 101.

In S901, the control unit 301 of the information processing device 102 sets the quantization value to be used to compress the frame images of the moving image to a predetermined value. In one example, the predetermined value may be sufficiently low so that the AI analysis on the server 101 is successful.

In S902, the control unit 301 determines whether the instruction information has been received from the server 101. In a case where the instruction information has not been received (NO in S902), the flow proceeds to S904. On the other hand, in a case where the instruction information has been received from server 101 (YES in S902), the flow proceeds to S903.

In S903, the control unit 301 may set the quantization value according to the instruction information from the server 101. For example, the instruction information may include the quantization value determined in the operation flow of FIGS. 6 and 8, the control unit 301 of the information processing device 102 may set the quantization value to be used to compress the frame images of the moving image to the quantization value notified in the instruction information from the server 101.

In S904, the control unit 301 compresses the frame image according to the set quantization value. Then, in S905, the control unit 301 transmits the compressed frame image to the server 101.

In S906, the control unit 301 determines whether the moving image still continues. For example, in a case where a subsequent frame image of the moving image is received from the imaging device 103, the control unit 301 may determine YES in S906, and the flow returns to S902 and the control unit 301 repeats the processing for the next frame image. On the other hand, for example, in a case where reception of the moving image data from the imaging device 103 has been completed, the control unit 301 may determine NO in S906, and the present operation flow ends.

As described above, according to the operation flow of FIG. 9, the control unit 301 of the information processing device 102 can compress the moving image data as much as possible while suppressing the deterioration in the analysis accuracy of the AI analysis on the server 101 and transmit the compressed moving image data to the server 101 by compressing the moving image according to the instruction information. Therefore, for example, in a case of aggregating and executing the AI analysis of the moving image on the cloud such as the server 101, it is possible to suppress congestion of a network band or the like caused by transmission of the moving image data while suppressing the deterioration in the analysis accuracy of the AI analysis.

Note that, in the above-described embodiment, an example of performing compression by uniformly applying the quantization value to the frame images of the moving image has been described. However, the embodiment is not limited thereto. For example, the embodiment can further enhance the compression effect by being used together with another technique for compressing moving image data for AI analysis.

For example, it is known that, when AI analysis is executed for an image, not all regions of the image are important for the AI analysis. Therefore, for example, even if the image is deteriorated by increasing the compression rate for a partial region of the frame image to be processed, the deterioration may not affect the result of the AI analysis. Therefore, hereinafter, an example of compressing the frame images using an importance map will be described.

For example, it is possible to generate the importance map that evaluates a region in the frame image by importance for AI analysis by evaluating an impact on the AI analysis in a case of deteriorating each region in the frame image to be processed by compression, or the like. Note that, as an example of the importance map, an occlusion sensitivity map can be used. However, the importance map according to the embodiment is not limited to the occlusion sensitivity map, and may be any map generated by another method as long as the map indicates the importance of each region in the image for AI analysis. For example, in another embodiment, the control unit 301 of the information processing device 102 may generate the importance map by changing the compression rate of the entire image to change the image quality, and totaling the degree of impact on the result of AI analysis when changing the compression rate for each image region obtained by dividing the image in a grid pattern.

FIGS. 10A to 10D are diagrams illustrating generation of an exemplary occlusion sensitivity map. For example, as illustrated in FIG. 10A, in generating the occlusion sensitivity map, the control unit 301 occludes a part of the frame image to be processed with a patch and inputs the frame image to AI analysis. At this time, if the occluded patch location is an important region for AI analysis, the accuracy information of correct answer decreases in an output layer. On the other hand, in a case where the occluded patch location is a region that is not important for AI analysis, the accuracy information of correct answer does not change much in the output layer.

For example, FIG. 10B and FIG. 10C illustrate the impact on the accuracy information of correct answer in the output layer according to a patch position in a case of detecting facial expressions by AI analysis. For example, in the detection results of facial expressions detected by the AI analysis, the impact is small even if a region other than the face is occluded. In FIG. 10B, a change in the accuracy information of correct answer is small. Meanwhile, for example, as illustrated in FIG. 10C, if a part of the face such as the lips is occluded by a patch, the accuracy information of correct answer significantly decreases in the output layer.

For example, the control unit 301 records a change in the accuracy information of correct answer in the output layer in association with the patch position while moving the patch so as to scan the image. Then, the control unit 301 may evaluate the importance that indicates whether each region in the image is an important region for facial expression detection by the AI analysis from the degree of decrease in the accuracy information of correct answer, and generate the importance map based on the evaluation. Note that, as described above, the higher the quantization value, the higher the compression rate. Therefore, in one example, the importance map may be generated such that less important regions have higher evaluation values.

FIG. 10D illustrates the generated importance map. As illustrated in FIG. 10D, since the importance of the regions outside the face is low, the value "10", which is higher than the other regions, is set in the importance map. On the other hand, the regions around the eyes and mouth of the face have high importance, and the value "0", which is lower than the other regions, is set in the importance map. Then, by performing control such that the compression rate of the unimportant regions is increased using the importance map that evaluates the importance in AI analysis in this way, it is possible to further lower the amount of data when transmitting the moving image data to the server 101 while suppressing the impact on the AI analysis accuracy.

Figure 11A:
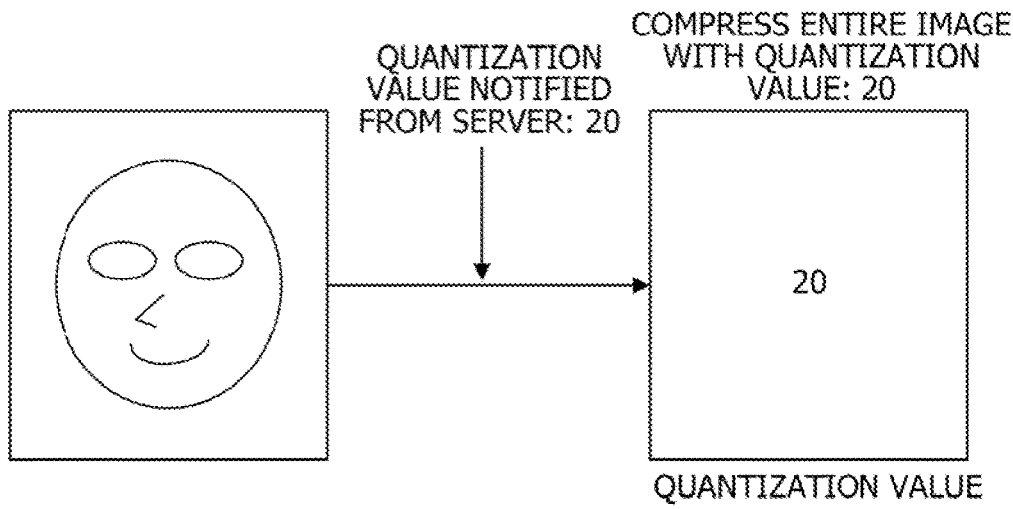
FIGS. 11A and 11B are diagrams illustrating an example of setting quantization values using the importance map according to the embodiment.
Figure 11B:
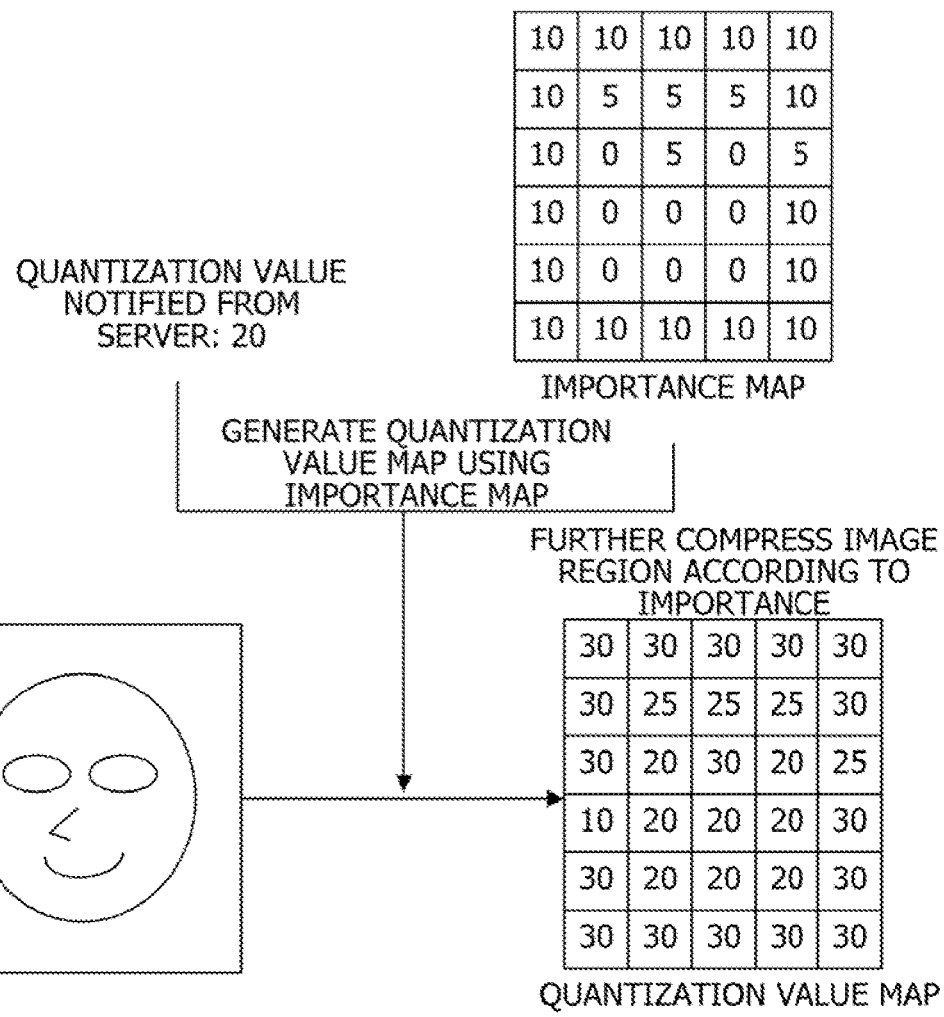

FIGS. 11A and 11B are diagrams illustrating an example of setting the quantization values using the importance map according to the embodiment. FIG. 11A illustrates an example in which the control unit 301 of the information processing device 102 compresses the frame images of the moving image using the quantization values notified from the server 101 in the above-described embodiment. As illustrated in FIG. 11A, the quantization value: 20 is notified from the server, and the control unit 301 of the information processing device 102 compresses the image by applying the quantization value: 20 to the entire image.

Meanwhile, FIG. 11B illustrates an example of determining the quantization value of each region using the quantization value: 20 notified from the server 101 and the importance map. For example, in FIG. 11B, the control unit 301 of the information processing device 102 adds the quantization value: 20 notified from the server 101 to the importance map to generate a quantization value map. In the quantization value map illustrated in FIG. 11B, the quantization value is kept at 20 notified from the server 101 for the regions of the frame image, such as around the eyes and mouth, which are important for AI analysis to detect facial expressions. Meanwhile, for example, in the regions outside the face, which are not important for the AI analysis that detects facial expressions, the quantization value: 30, which is higher than the quantization value: 20 notified from the server 101, is set and moreover compressed.

In this way, by further increasing the quantization value according to the importance of the region in the image in the AI analysis, it is possible to further reduce the amount of data when transmitting the moving image data to the server 101 while suppressing the impact on the AI analysis accuracy.

Note that, in FIGS. 10A to 10D and FIGS. 11A and 11B, an example of generating the importance map for the AI analysis that detects facial expressions has been described, but the embodiment is not limited thereto. The control unit 301 of the information processing device 102 can generate the importance map by specifying the important regions in the AI analysis with the frame images to be processed, using an AI analysis model applied in the embodiment. Furthermore, the AI analysis model used to generate the importance map may be a part of an AI analysis model executed by the server 101, for example. For example, it is assumed that the server 101 executes AI analysis such as detecting a person from a frame image of a moving image by AI analysis, and then detecting skeleton of a human body by another AI analysis and determining a posture. In this case, by deploying the AI analysis model for detecting a person in the information processing device 102 and generating the importance map, it is possible to obtain an effect of reducing the amount of data when transmitting the moving image data to the server 101.

Second Embodiment

Next, a second embodiment will be illustrated. For example, a plurality of analysis targets may be captured in a frame image of a moving image.

Figure 12:
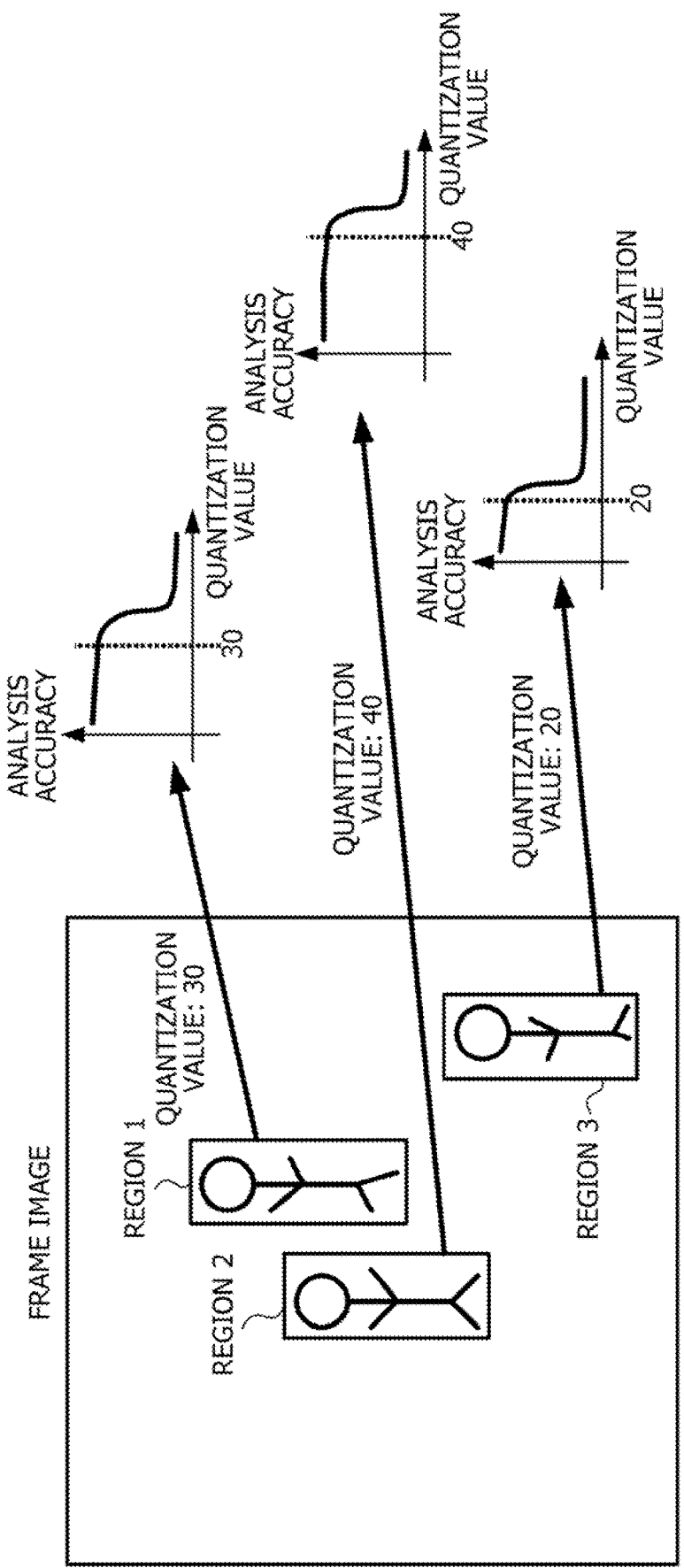
FIG. 12 is a diagram illustrating setting of quantization values for frame images of a moving image in which a plurality of analysis targets is captured according to a second embodiment.

FIG. 12 is a diagram illustrating setting of quantization values for a frame image of a moving image in which a plurality of analysis targets is captured according to the second embodiment. In FIG. 12, three persons are detected as analysis targets. In this case, a control unit 201 of a server 101 executes, for example, processing of determining the above-described quantization value for each of the detected analysis targets. For example, the control unit 201 may execute processing of determining the above-described quantization value for each of a region 1, a region 2, and a region 3 indicating a region where the analysis target is detected. Then, for example, the control unit 201 may determine the smallest quantization value among the quantization values determined for the plurality of respective analysis targets as the quantization value to be used to compress moving image data. For example, in FIG. 12, the quantization value: 30 is determined in association with the region 1, the quantization value: 40 is determined in association with the region 2, and the quantization value: 20 is determined in association with the region 3. In this case, the control unit 201 may transmit instruction information to an information processing device 102 so as to use the quantization value: 20 of the region 3 determined as the smallest quantization value. Furthermore, in another embodiment, the control unit 201 of the server 101 may output instruction information for instructing use of a plurality of quantization values determined for respective regions to be analyzed for the regions to be analyzed to the information processing device 102. In this case, the instruction information may include, for example, a plurality of sets of information that associate regions with quantization values for the regions.

Figure 13:
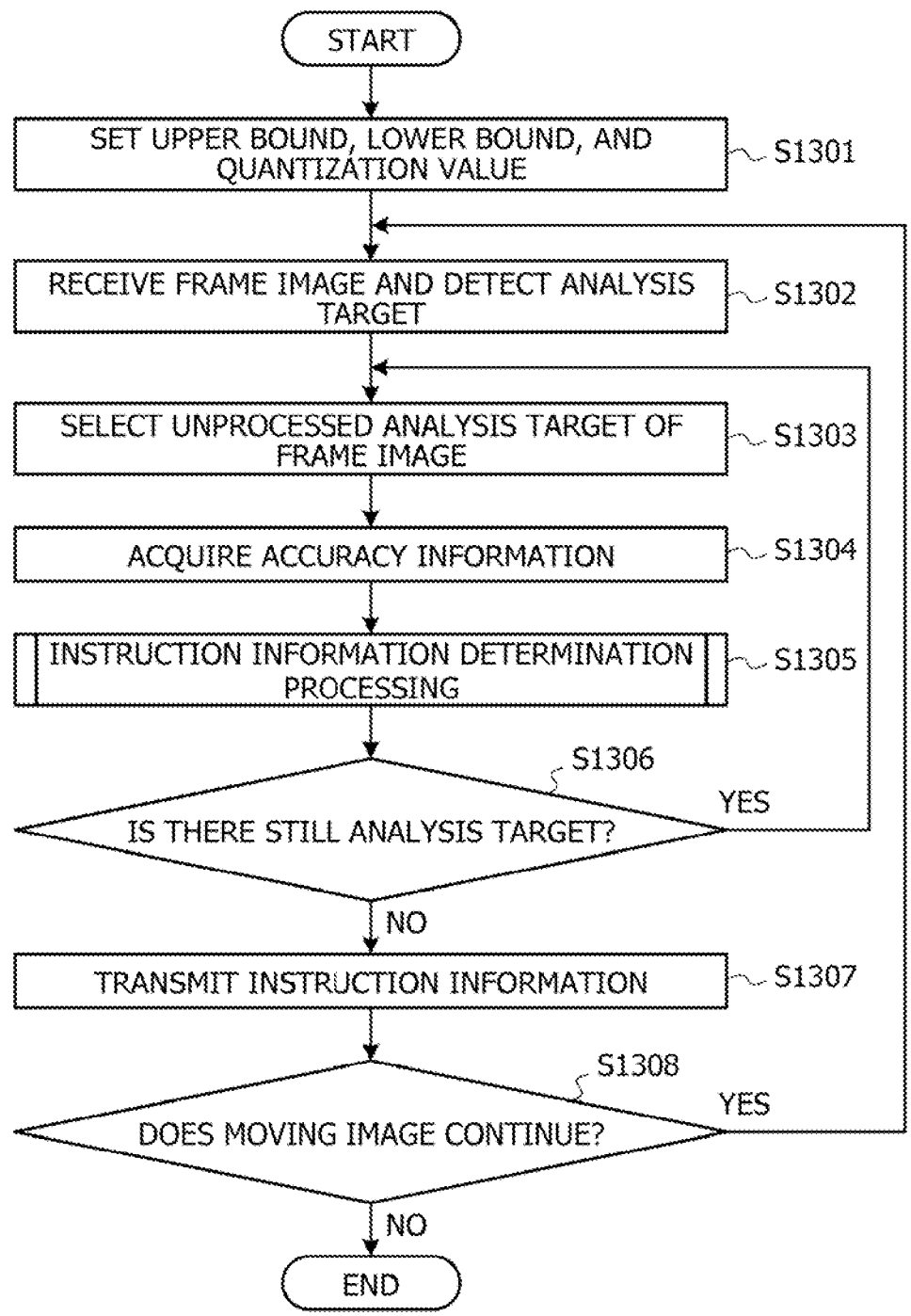
FIG. 13 is a flowchart illustrating an operation flow of instruction information transmission processing according to the second embodiment.

FIG. 13 is a flowchart illustrating an operation flow of instruction information transmission processing according to the second embodiment. For example, the control unit 201 of the server 101 may start the operation flow in FIG. 13 when starting execution of the AI analysis for the moving image data received from the information processing device 102.

In S1301, the control unit 201 of the server 101 sets an upper bound, a lower bound, and the quantization value. For example, the control unit 201 may set the quantization value currently applied to the frame image of the moving image data received from the information processing device 102 as the quantization value. Furthermore, the control unit 201 may set, for example, the upper bound and the lower bound to predetermined values set in advance to the upper bound and the lower bound, respectively.

In S1302, the control unit 201 receives the frame image of the moving image from the information processing device 102, and detects the analysis target from the frame image. For example, the control unit 201 may detect the analysis target from the frame image to be processed by executing AI analysis or the like. In S1303, the control unit 201 selects one unprocessed analysis target from among the detected analysis targets.

Subsequent processing of S1304 and S1305 may correspond to the processing of S602 and S603, and the control unit 201 may execute similar processing to S602 and S603. Note that the control unit 201 may acquire accuracy information for the region of the selected unprocessed analysis target in S1304, and may execute the operation flow of FIG. 8 for the region to determine the instruction information in S1305.

In S1306, the control unit 201 determines whether there is still an unprocessed analysis target. In a case where there is an unprocessed analysis target (YES in S1306), the flow returns to S1303 and repeats the processing for the unprocessed analysis target. On the other hand, in a case where there is no unprocessed analysis target (NO in S1306), the flow proceeds to S1307.

In S1307, the control unit 201 transmits the instruction information to the information processing device 102. The instruction information may include, for example, the minimum value among the quantization values determined for the analysis targets, and in another embodiment, the instruction information may include a set of the region where each analysis target is detected and the quantization value determined for the region of the analysis target.

In S1308, the control unit 201 may determine whether the moving image still continues. For example, in a case where a subsequent frame image of the moving image is still being received from the information processing device 102, the control unit 201 may determine YES in S1308, the flow returns to S1302, and the control unit 201 repeats the processing for the next frame image. On the other hand, for example, in a case where reception of the moving image data from the information processing device 102 has been completed, the control unit 201 may determine NO in S1308, and the present operation flow ends.

As described above, according to the second embodiment, even in the case where a plurality of analysis targets is captured in the moving image, it is possible to determine a compression rate so as to compress the moving image data as much as possible while suppressing deterioration in analysis accuracy of AI analysis.

[Modification]

Next, a modification of the embodiment will be described. For example, a plurality of AI analyses may be performed for one frame image of a moving image.

For example, in a case of recognizing human parts using a cascaded pyramid network (CPN), or the like, there is a case where a plurality of AI analyses is executed for one analysis target such as a human, and accuracy information of the plurality of AI analyses is acquired. One example is a case where a plurality of AI analyses is executed, and each part of the human body, such as the nose, right eye, left eye, right wrist, or left wrist, is detected. In this case, the control unit 201 may obtain the quantization value for each piece of the accuracy information of the plurality of AI analyses, and notify the minimum quantization value using the instruction information.

In this case, the control unit 201 may execute the operation flows of FIGS. 6 and 8 similarly to the first embodiment. Note that the control unit 201 may detect the sign of the deterioration for each of the pieces of accuracy information of the plurality of AI analyses in the processing of S801, and determine whether the sign of the deterioration is detected in any of the pieces of accuracy information of the AI analyses, for example.

According to the modification, even in the case of executing a plurality of AI analyses for the analysis targets, it is possible to determine the compression rate so as to compress the moving image data as much as possible while suppressing the deterioration in the analysis accuracy of the AI analyses.

Note that the above-described second embodiment and modification may be executed in combination with the importance map-based compression described with reference to FIGS. 10A to 10D and FIGS. 11A and 11B.

Furthermore, in the above-described embodiments, examples of applying the embodiments in order to reduce the amount of data of the moving image data to be transmitted from the information processing device 102 to the server 101 have been described. However, the embodiments are not limited thereto. For example, the embodiments may be used to reduce the amount of data when saving the moving image data in a storage device. As an example, it is conceivable to leave the moving image data together with the analysis result as an evidence when executing the AI analysis for the captured moving image data. In this case, by adjusting the compression rate according to the above-described embodiment, it is possible to obtain the moving image data compressed within the range suitable for AI analysis, and reduce the amount of data to be saved in the storage device.

Although the embodiments have been described above, the embodiments are not limited thereto. For example, the above-described operation flows are exemplary, and the embodiments are not limited to the operation flows. If possible, the operation flows may also be executed by changing the order of processing or may also additionally include further processing, or a part of processing may also be omitted. For example, the processing of S813 and S814 in FIG. 8 may not be executed.

Furthermore, for example, in the above-described embodiments, an example in which the control unit 201 of the server 101 notifies the information processing device 102 of the quantization value included in the instruction information, and controls the compression rate of the frame images of the moving image in the information processing device 102 based on the quantization value of the instruction information has been described. However, the embodiments are not limited thereto. In another embodiment, a control unit 201 of a server 101 may detect a sign of deterioration in S603, and may notify an information processing device 102 of instruction information indicating the detection of the sign of deterioration in S604 in a case of detecting the sign.

In this case, the control unit 301 of the information processing device 102 may execute control to lower the quantization value by a predetermined value when receiving the notification of the instruction information. Furthermore, in this case, the control unit 301 of the information processing device 102 may execute control of repeating the processing of increasing the quantization value by a predetermined value to gradually raise the quantization value in a case where, for example, the instruction information has not been notified from the server 101 for a predetermined period. As a result, the control unit 301 of the information processing device 102 can adjust the compression rate before the accuracy of the AI analysis is completely decreased according to the instruction information notified from the server 101 based on the detection of the sign of the accuracy deterioration in the AI analysis. As a result, it is possible to increase the compression rate of the moving image data while suppressing the deterioration in the analysis accuracy of the AI analysis. Alternatively, in another embodiment, the control unit 301 of the information processing device 102 may execute the operation flow of FIG. 8. In this case, the control unit 301 of the information processing device 102 may determine the presence or absence of the detection of the sign of the deterioration in S801 based on reception of the instruction information that indicates the detection of the sign of the deterioration notified from the server 101, for example, and control the quantization value to be used to compress the moving image.

Furthermore, the above-described embodiments have been described using the moving image compression method using the quantization value as an example, but the moving image compression method that can be used in the embodiments is not limited thereto, and another moving image compression method may be used.

Note that in the above-described embodiments, for example, in the processing of S602 and S1302, the control unit 201 operates as a reception unit. Furthermore, for example, in the processing of S801, the control unit 201 operates as a detection unit. For example, in the processing of S604, the control unit 201 operates as a transmission unit. For example, in the processing from S802 to S814, the control unit 201 operates as a change unit.

Figure 14:
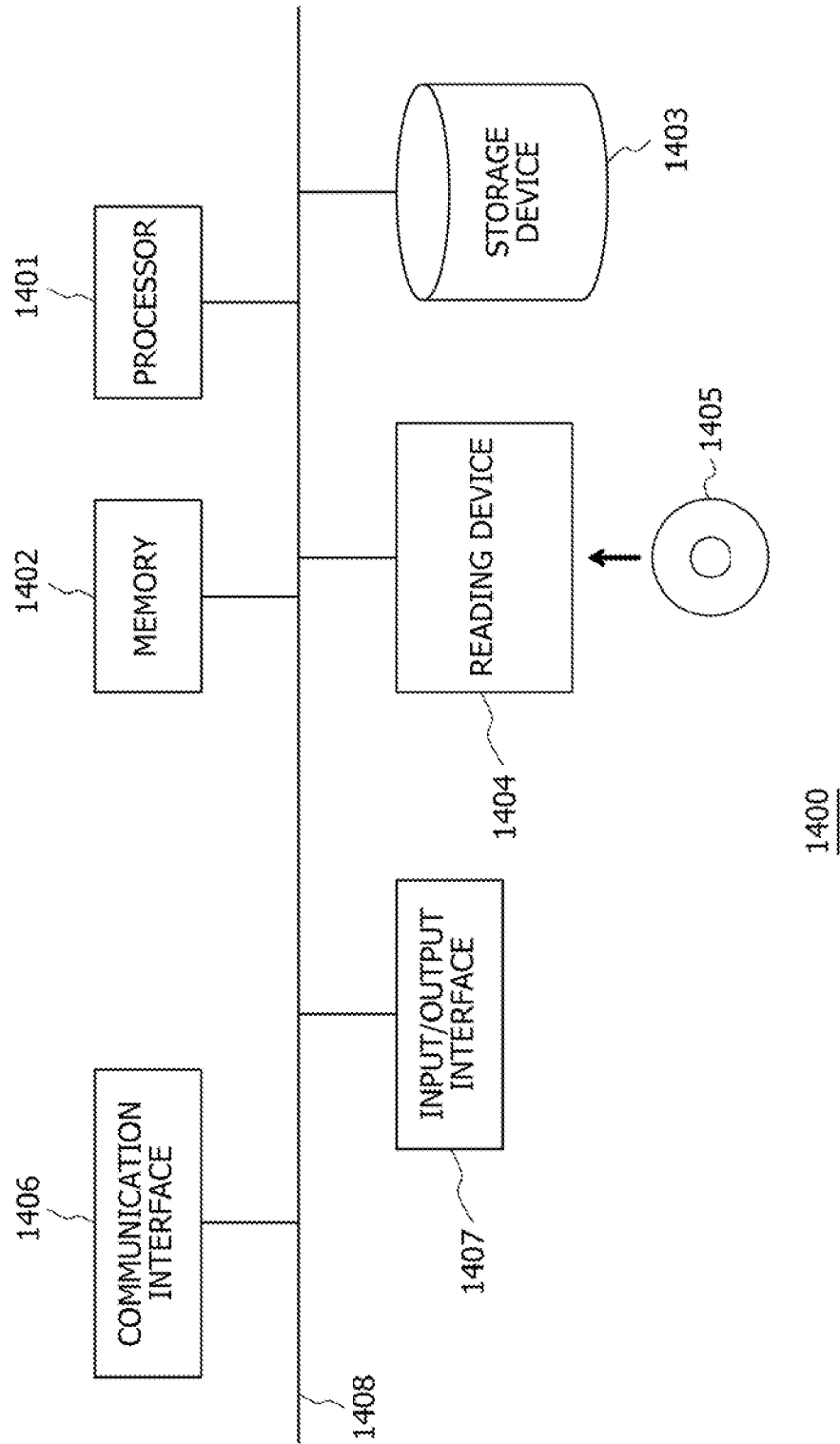
FIG. 14 is a diagram illustrating a hardware configuration of a computer for implementing a server and an information processing device according to the embodiment.

FIG. 14 is a diagram illustrating a hardware configuration of a computer 1400 for implementing the server 101 and the information processing device 102 according to the embodiments. The hardware configuration for implementing the server 101 and the information processing device 102 in FIG. 14 includes, for example, a processor 1401, a memory 1402, a storage device 1403, a reading device 1404, a communication interface 1406, and an input/output interface 1407. Note that the processor 1401, the memory 1402, the storage device 1403, the reading device 1404, the communication interface 1406, and the input/output interface 1407 are coupled to each other via a bus 1408, for example.

The processor 1401 may be, for example, a single processor, a multiprocessor, or a multicore processor. The processor 1401 provides some or all of the functions of the above-described control unit 201 of the server 101 or the above-described control unit 301 of the information processing device 102 by executing, for example, a program that describes the procedures of the operation flows using the memory 1402. For example, the processor 1401 of the server 101 operates as the reception unit 211, the detection unit 212, the transmission unit 213, and the change unit 214 by reading and executing a program stored in the storage device 1403.

The memory 1402 is, for example, a semiconductor memory, and may include a RAM region and a ROM region. The storage device 1403 is, for example, a semiconductor memory such as a hard disk or a flash memory, or an external storage device. Note that the RAM is an abbreviation for random access memory. In addition, the ROM is an abbreviation for read only memory.

The reading device 1404 accesses a removable storage medium 1405 according to an instruction from the processor 1401. The removable storage medium 1405 is achieved by, for example, a semiconductor device, a medium to and from which information is input and output by magnetic action, a medium to and from which information is input and output by optical action, or the like. Note that the semiconductor device is, for example, a universal serial bus (USB) memory. Furthermore, the medium to and from which information is input and output by magnetic action is, for example, a magnetic disk. The medium to and from which information is input and output by optical action is, for example, a CD-ROM, a DVD, or a Blu-ray Disc (Blu-ray is a registered trademark), or the like. The CD is an abbreviation for compact disc. The DVD is an abbreviation for digital versatile disk.

The above-described storage unit 202 of the server 101 and the above-described storage unit 302 of the information processing device 102 include the memory 1402, the storage device 1403, and the removable storage medium 1405, for example. For example, the storage device 1403 of the server 101 stores the quantization value information 700, the compressed moving image data received from the information processing device 102, and the like. Furthermore, for example, the storage device 1403 of the information processing device 102 stores the moving image data captured by the imaging device 103, the instruction information notified from the server 101, and the like.

The communication interface 1406 communicates with another device according to an instruction from the processor 1401. The communication interface 1406 is an example of the above-described communication unit 203 of the server 101 and the above-described communication unit 303 of the information processing device 102, for example. For example, the server 101 communicates with the information processing device 102 via the communication interface 1406. Furthermore, the information processing device 102 communicates with the server 101 and the imaging device 103 via the communication interface 1406, for example. Note that data transmission/reception among devices such as the server 101, the information processing device 102, and the imaging device 103 in the above-described embodiments may be directly executed, or may be executed via another device by specifying a destination, for example.

The input/output interface 1407 may be, for example, an interface between an input device and an output device. The input device is, for example, a device such as a keyboard, a mouse, or a touch panel that receives an instruction from a user. The output device is, for example, a display device such as a display or an audio device such as a speaker.

Each program according to the embodiments is provided to the server 101 and the information processing device 102 in the following form of, for example:

(1) being installed in the storage device 1403 in advance;
(2) being provided by the removable storage medium 1405; and
(3) being provided from a server such as a program server.

Note that the hardware configuration of the computer 1400 for implementing the server 101 and the information processing device 102 described with reference to FIG. 14 is exemplary, and the embodiments are not limited thereto. For example, a part of the above-described configuration may be deleted, or a new configuration may be added. Furthermore, in another embodiment, for example, some or all of the functions of the above-described control unit 201 of the server 101 and the above-described control unit 301 of the information processing device 102 may be implemented as hardware by FPGA, SoC, ASIC, PLD, and the like. Note that the FPGA is an abbreviation for field programmable gate array. The SoC is an abbreviation for system-on-a-chip. The ASIC is an abbreviation for application specific integrated circuit. The PLD is an abbreviation for programmable logic device.

Several embodiments have been described above. However, the embodiment is not limited to the embodiments described above, and it should be understood that the embodiment includes various modification forms and alternative forms of the embodiments described above. For example, it would be understood that various embodiments may be embodied by modifying configuration elements without departing from the spirit and scope of the embodiments. Furthermore, it would be understood that various embodiments may be implemented by appropriately combining a plurality of configuration elements disclosed in the embodiments described above. Moreover, a person skilled in the art would understand that various embodiments may be implemented by deleting some configuration elements from all the configuration elements indicated in the embodiments or by adding some configuration elements to the configuration elements indicated in the embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A server comprising:
   a memory; and
   a processor coupled to the memory and configures to:
   receive a frame image of a moving image compressed by an information processing device;
   detect a sign of deterioration in analysis accuracy based on accuracy information that represents certainty of an analysis result by artificial intelligence for the frame image;
   transmit, to the information processing device, instruction information of controlling a compression rate in compression of the moving image by the information processing device between an upper bound and a lower bound; and
   change the upper bound and the lower bound according to stability of the analysis accuracy based on the detection of a sign of deterioration in the analysis accuracy.

2. The server according to claim 1, wherein the processor changes the lower bound to be lowered when detecting the sign of deterioration in the analysis accuracy in a state where the compression rate in compression of the moving image by the information processing device is controlled to the lower bound by the transmission of the instruction information.

3. The server according to claim 1, wherein the processor changes the lower bound to rise in a case where a predetermined period has passed since the change of the lower bound.

4. The server according to claim 1, wherein the processor changes the upper bound to rise in a case where the sign of deterioration in the analysis accuracy is not detected while satisfying a predetermined condition in a state where the compression rate in compression of the moving image by the information processing device is controlled to the upper bound by the transmission of the instruction information.

5. The server according to claim 1, wherein the processor changes the upper bound to be lowered in a case where the control of the compression rate to the upper bound satisfies a predetermined change condition and is small in past transmission of the instruction information.

6. The server according to claim 1, wherein the processor determines, based on first accuracy information that represents the certainty of an analysis result by artificial intelligence obtained from a first period frame image of the moving image, and second accuracy information that represents the certainty of an analysis result by artificial intelligence obtained from a second period frame image, the second period being shorter than the first period in the moving image, whether the sign of deterioration in the analysis accuracy has been detected for an analysis by the artificial intelligence using the second period frame image.

7. The server according to claim 6, wherein the processor determines that the sign of deterioration in the analysis accuracy for the analysis by the artificial intelligence using the second period frame image is detected, in a case where variation in the second accuracy information of the second period of the moving image is larger than variation in the first accuracy information of the first period.

8. The server according to claim 6, wherein the processor determines that the sign of deterioration in the analysis accuracy for the analysis by the artificial intelligence using the second period frame image is detected, in a case where accuracy indicated by a second index that represents the second accuracy information of the second period of the moving image is more deteriorated than accuracy indicated by a first index that represents the first accuracy information of the first period.

9. The server according to claim 1, wherein the processor reduces a change width and a change frequency of the upper bound and the lower bound in a case where values of the upper bound and the lower bound satisfy a predetermined convergence condition and converge in past transmission of the instruction information.

10. The server according to claim 1, wherein the processor increases a change width and a change frequency of the upper bound and the lower bound in a case where values of the upper bound and the lower bound satisfy a predetermined fluctuation condition and fluctuate in past transmission of the instruction information.

11. A control method comprising:
    receiving a frame image of a moving image compressed by an information processing device;
    detecting a sign of deterioration in analysis accuracy based on accuracy information that represents certainty of an analysis result by artificial intelligence for the frame image;
    transmitting, to the information processing device, instruction information of controlling a compression rate in compression of the moving image by the information processing device between an upper bound and a lower bound; and changing the upper bound and the lower bound according to stability of the analysis accuracy based on the detection of a sign of deterioration in the analysis accuracy.

12. A non-transitory computer-readable recording medium storing a control program causing a computer to execute a processing of:

receiving a frame image of a moving image compressed by an information processing device;

detecting a sign of deterioration in analysis accuracy based on accuracy information that represents certainty of an analysis result by artificial intelligence for the frame image;

transmitting, to the information processing device, instruction information of controlling a compression rate in compression of the moving image by the information processing device between an upper bound and a lower bound; and changing the upper bound and the lower bound according to stability of the analysis accuracy based on the detection of a sign of deterioration in the analysis accuracy.

* * * * *